(12) United States Patent
Walker et al.

(10) Patent No.: US 8,816,300 B1
(45) Date of Patent: Aug. 26, 2014

(54) PORTABLE UV-LED WATER PURIFICATION SYSTEM

(71) Applicant: Rayvio Corporation, Redwood City, CA (US)

(72) Inventors: Robert C. Walker, Redwood City, CA (US); Milan Minsky, Newton, MA (US)

(73) Assignee: Rayvio Corporation, Redwood City, CA (US)

( * ) Notice: Subject to any disclaimer, the term of this patent is extended or adjusted under 35 U.S.C. 154(b) by 0 days.

(21) Appl. No.: 13/831,087

(22) Filed: Mar. 14, 2013

(51) Int. Cl.
*C02F 1/32* (2006.01)

(52) U.S. Cl.
USPC ............. 250/453.11; 250/455.11; 250/504 R; 250/432 R; 210/192; 210/198

(58) Field of Classification Search
USPC ................ 250/453.11, 455.11, 504 R, 504 H, 250/432 R; 210/192, 198
See application file for complete search history.

(56) References Cited

U.S. PATENT DOCUMENTS

| | | | | |
|---|---|---|---|---|
| 4,755,292 | A * | 7/1988 | Merriam | 210/192 |
| 6,058,718 | A * | 5/2000 | Forsberg et al. | 62/125 |
| 6,182,453 | B1 * | 2/2001 | Forsberg | 62/125 |
| 6,403,030 | B1 * | 6/2002 | Horton, III | 210/748.11 |
| 6,447,721 | B1 * | 9/2002 | Horton et al. | 210/748.11 |
| 6,514,405 | B1 * | 2/2003 | Lifschitz | 210/143 |
| 6,579,495 | B1 * | 6/2003 | Maiden | 210/748.11 |
| 6,767,453 | B2 * | 7/2004 | Lifschitz | 210/85 |
| 7,169,311 | B2 * | 1/2007 | Saccomanno | 210/198.1 |
| 7,390,417 | B2 * | 6/2008 | Kuhlmann et al. | 210/748.11 |
| 7,534,356 | B2 * | 5/2009 | Saccomanno | 210/748.11 |
| 7,744,592 | B2 * | 6/2010 | Hoenig et al. | 606/33 |
| 2006/0155545 | A1 * | 7/2006 | Jayne | 704/272 |

* cited by examiner

*Primary Examiner* — David A Vanore
(74) *Attorney, Agent, or Firm* — Richard T. Ogawa; Ogawa, P.C.

(57) ABSTRACT

A portable water purification device comprises a portable power supply, an ultraviolet light source coupled to the portable power supply, wherein the ultraviolet light source is configured to output ultraviolet light, a container coupled to the ultraviolet light source, wherein the container is configured to hold water, and wherein the container is configured to reflect ultraviolet light, and an indicator configured to output a visual indication when the ultraviolet light source is outputting ultraviolet light.

20 Claims, 2 Drawing Sheets

PORTABLE UV-LED WATER PURIFICATION SYSTEM

BACKGROUND OF THE INVENTION

The present invention relates to water purification. More specifically, embodiments of the present invention relate to a UV-LED water purification system and methods of operation.

The inventor of the present invention is aware of different ways to purify water making it safe for human consumption. One method includes using very small pore-sized ultra-filters that can filter out small bacteria and viruses. One drawback to this approach is that such filters are expensive to manufacture and requires frequent replacement, as the pores become clogged. Another method includes immersing Hg-based UV lamps into a bottle of water. Drawbacks to this approach include that such devices are typically relative large in size, and as such, the design of purification systems have design constraints. Other drawbacks include that such devices are often fragile; generally require higher power requirements/voltages; have limited life times; and the like.

Additional methods for purifying water include chlorination or other chemical-based systems. Drawbacks to such approaches include introducing potentially toxic chemicals to the water, the resulting water having a chemical taste, and the like, and that the chemicals must be accurately dosed. Other drawbacks include that chemicals are often consumable and must be constantly repurchased. Still other methods require physically large systems that are non-portable, require great power, and the like.

From the above, it is desired to have an ultraviolet light source for water purification without the drawbacks described above.

BRIEF SUMMARY OF THE INVENTION

The present invention relates to water purification. More specifically, embodiments of the present invention relate to a UV-LED water purification system and methods of operation.

Various embodiments of the present invention include a water purification system (e.g. a "water pitcher") that uses ultraviolet LEDs to kill bacteria, viruses, and spores in unsanitary water. More particularly, unsanitary water may include water of unknown-safety, pathogen-bearing water, or other types of liquid that if consumed by a human (or other animal) could cause illness or death.

In various embodiments, a system may include some or all of the following elements: a) a pre-filter to remove UV-absorbing solids; b) a tube for water to flow into a holding tank; c) a holding tank to contain the water (potentially of a UV reflecting material, such as aluminum); d) a tube for channel for pouring/removing water; e) UV LEDs for emitting and directing UV light into the water to purify it (these could be in the entry tube, the holding tank, or the exit channel); f) a power source—could be a solar cell, or a connection to an external power source (battery, AC), etc.; g) an internal battery, which could be charged and used later to power the device; h) a UV sensitive detector to confirm that UV light was illuminating and penetrating the water; i) an interlock that would detect when unpurified water was entered into the holding tank; j) indicator lights, that would indicate whether the water in the holding tank had been purified or not, or the like.

In some embodiments, UV-LEDs have several advantages over existing solutions, including: a) compact size of the UV light source (and/or power source); b) instant on/off (on-demand) water sanitizing; c) frequent on/off cycling capability (without an effect on lifespan); d) low voltage operation (battery powered); e) long life time; f) non-consumable.

According to one aspect of the invention, a portable water purification device is disclosed. One device includes a portable power supply and an ultraviolet light source coupled to the portable power supply, wherein the ultraviolet light source is configured to output ultraviolet light. An apparatus includes a container coupled to the ultraviolet light source, wherein the metal container is configured to hold water, and wherein the metal container is configured to reflect ultraviolet light, and an indicator configured to output a visual indication when the ultraviolet light source is outputting ultraviolet light.

According to another aspect of the invention, a portable water purification device is disclosed. One device includes a housing, and a battery disposed within the housing, wherein the battery is configured to supply electrical power. An apparatus includes an ultraviolet light source coupled to the battery and disposed within the housing, wherein the ultraviolet light source is configured to output ultraviolet light in response to the electrical power and an initiator circuit coupled to the battery and the ultraviolet light source and disposed within the housing, wherein the initiator circuit is configured to allow electrical power to be provide to the ultraviolet light source in response to an input from a user. One unit includes a UV indicator disposed within the housing, wherein the indicator is configured to provide a visual indication when the ultraviolet light is output, a container coupled to the ultraviolet light source and disposed within the housing, wherein the container is configured to hold water, and wherein the container is configured to reflect ultraviolet light, and a closable, water opening within the housing, wherein the closable, water opening is configured to allow water to be input into the metal container.

various additional objects, features and advantages of the present invention can be more fully appreciated with reference to the detailed description and accompanying drawings that follow

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1A:
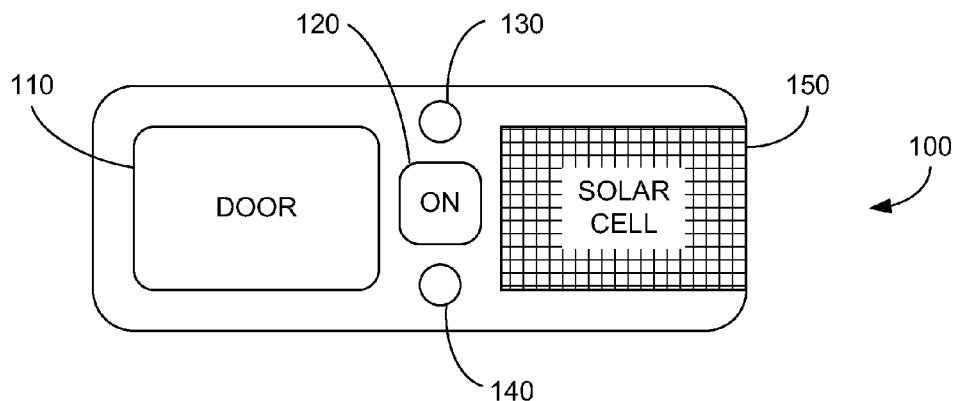
FIGS. 1A-B illustrate an example of various embodiments of the present invention.
Figure 1B:
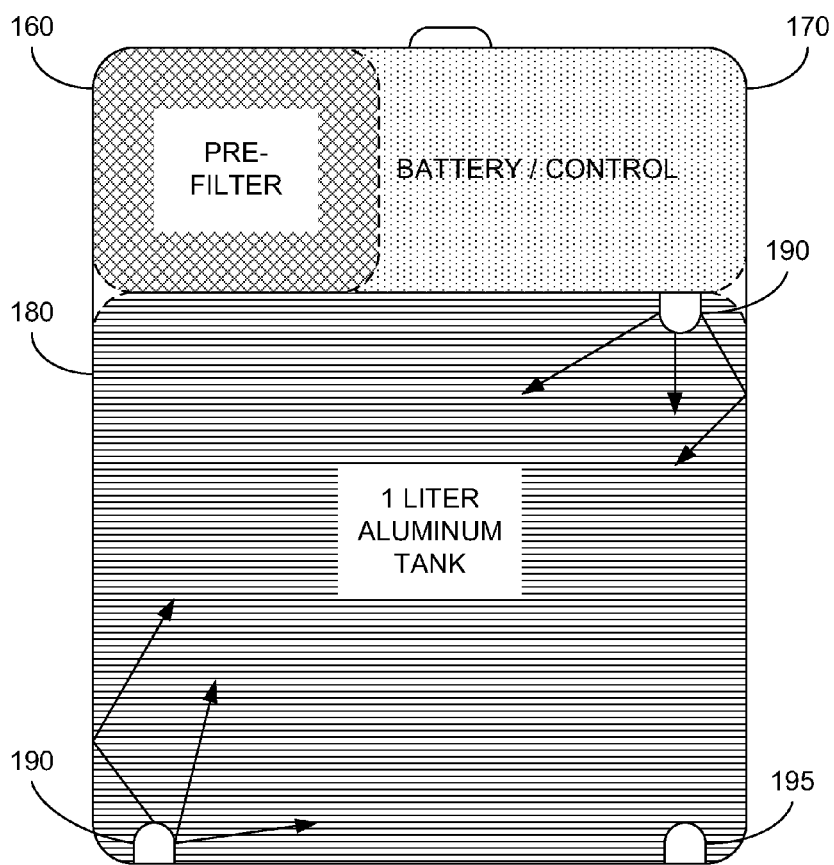

FIGS. 1A-B illustrate an example according to some embodiments of the present invention. In particular, FIG. 1A illustrates a possible top view and FIG. 1B illustrates a possible side view of a device.

As illustrated in FIG. 1A, a water purification device 100 may include a liquid input and/or output door 100 that allows water or other liquid to be purified into device 100. In other embodiments, a separate input channel or opening and a separate output channel or opening may be used. In some embodiments, an interlock mechanism may be implemented with door 100 or other water output channel. In various embodiments, the interlock mechanism may selectively inhibit water from being output from device 100 upon certain conditions, e.g. water insufficiently purified.

Also illustrated in FIG. 1A are a button/switch 120 that allows a user to initiate a liquid (e.g. water) purification process. In various embodiments, one or more status lights 130 and 140 may be provided that provide visual indication to the user of the water purification status. As an example, light 130 may indicate that power is being provided to the UV lights, i.e. the water purification process is currently being performed; light 140 may indicate whether the water has been purified; light 140 may indicate that the water has not been purified; and the like.

FIG. 1A also includes an external power supply mechanism for embodiments of the present invention. As illustrated in FIG. 1B it is contemplated that device 100 is a battery-powered device. In some embodiments, a solar cell 150 may be provided to help charge the battery. In other embodiments, the battery may be charged via a user-wind-up crank or by other mechanical means; the battery may be charged via another battery, e.g. USB or other charging port; the battery may be charged by a plug-in wall transformer; the battery may be charged inductively; the battery may be charged via fuel cell, heat, or the like; and the like.

In the side-view illustrated in FIG. 1B, a device 100 may include a filtering mechanism 160, an electrical control portion 170, and a holding tank 180. In this example, holding tank includes one or more high-efficiency, low voltage UV LEDs, currently under development by the assignee of the present patent application. In some examples, a UV detector/indicator 195 may also be provided.

In various embodiments, filtering mechanism 160 may include a physical filtration device, for example a filter with pore size of <1 micron, <0.1 micron, or the like. In some embodiments, the pore size may be larger, as filtering mechanism 160 may be used to filter sediments, but not pathogens, e.g. bacteria, or the like. Additionally, in some embodiments filtering mechanism 160 may include chemical treatments, e.g. silver, or the like. In light of the present disclosure, one of ordinary skill in the art will recognize other types of filtration/treatment can be performed before the UV water purification described herein.

In some embodiments, filtering mechanism 160 may not be needed as device 100 receives output form a separate water filtration/purification process. Accordingly, device 100 may be used to simply purify the water with UV light.

In various embodiments, control portion 170 controls application of electrical power to UV LEDs 190. Further detail will be given in conjunction with FIG. 2.

In various embodiments, holding tank 180 is a holding tank 180 that holds water for purification. In various examples, holding tank 180 may be made of a metal that reflects UV light waves, such as coated stainless steel, coated aluminum, glass with an external aluminum coating, glass with a silver coating, or the like. The inventors of the present invention believe that by using a UV reflective coating, the water stored within holding tank 180 can be subject to higher doses of UV light from the UV LED and from reflected UV light from the walls of holding tank 180. As can be seen in FIG. 1B, UV LEDs 190 may be placed in more than one location within holding tank 180 to help ensure the water contained therein is fully exposed to UV light.

In the example of FIG. 1B, a separate UV indicator 195 may be provided on holding tank 180. In various embodiments, UV indicator 195 may visually confirm or indicate to the user that UV purification is occurring. In this example UV indicator 195 may be electrically separate from control portion 170. In one example, if UV LEDs burn out, or the like, and do not output UV light, although indicator 130 is lit, UV indicator 195 will not "see" UV light in holding tank 180 and will indicate so. In these examples, the user will not drink the water because UV indicator 195 is not lit, for example. In some embodiments, UV indicator 195 may include a blue-LED that is exposed to the water within holding tank 180. When the blue-LED sees UV light, it will produce a voltage across its leads, which, may power an indicator LED, for example.

Figure 2:
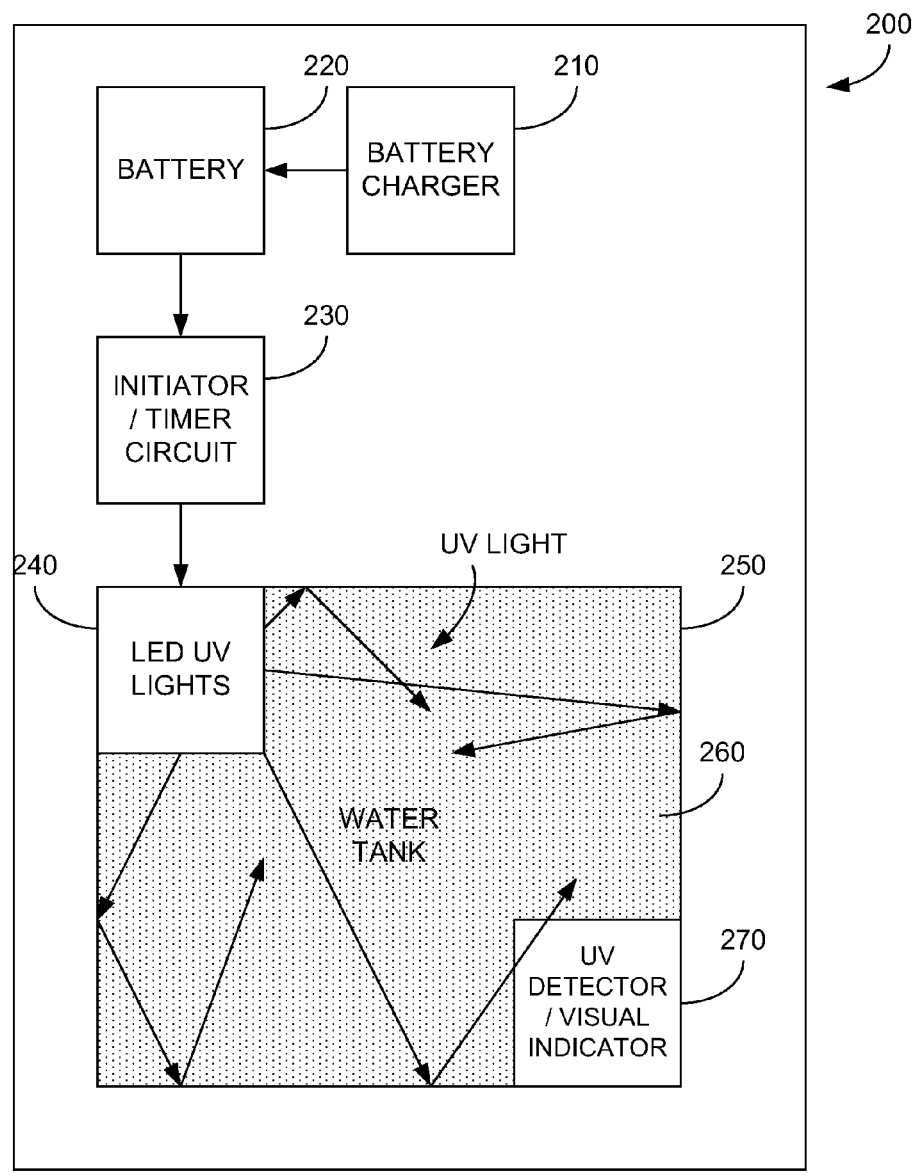
FIG. 2 illustrates a functional block diagram of various embodiments of the present invention.

FIG. 2 illustrates a block diagram according to various embodiments of the present invention. In this diagram, a water purification device 200 includes a battery charger portion 210, a battery 220, an initiator/timer portion 230, and UV LEDs 240. Also illustrated are a water holding tank 250 including water 260, and a UV detector 270.

As discussed above in conjunction with FIG. 1, battery 220 may be charged by battery charger 210 which may be a solar cell, wind-up/crank generator, external transformer or the like. In other embodiments, battery charger 210 need not be located within device 200.

In various embodiments, circuit 230 is used to receive the user press of button 120, in FIG. 1A, for example to initiate exposure of water 260 to UV light. In various implementations, circuit 230 may include a timer mechanism that has pre-stored therein a threshold time for purification of the maximum amount of water 260 in holding tank 250. In some embodiments, the threshold time may be double the time actually required, to account for particulate contamination, or other sediments in water 260 in holding tank 250.

In some embodiments, the threshold time may dynamically vary based upon a sensed turbidity of the water. For example, another UV sensor may be provided on the opposite side of the holding tank 250 from a UV LED 240, to sense how much UV is getting through water 260. If little UV light is transmitted, the UV exposure threshold time may be increased. In other embodiments, the power output of the UV LEDs 240 may also be varied to adjust the duration of the disinfectant time. For example, for clear water, UV LEDs 240 may output half as much UV light as for cloudy water.

As discussed above, in FIG. 2, by using an opaque material for holding tank 180, the power of UV LEDs can be increased, compared to embodiments where a transparent holding tank is used. More particularly, because UV light cannot normally escape, the UV light power can be increased, and the UV light that crosses holding tank 180 does not escape, but is redirected into water 260. Such embodiments are thus believed to enable higher power UV light and shorter water purification times.

Further embodiments can be envisioned to one of ordinary skill in the art after reading this disclosure. For example, in other embodiments: a pre-filter may be provided to remove UV-absorbing solids; a tube may be included to allow water to flow into a holding tank; a holding tank to contain the water may include a UV reflecting material, such as aluminum, or the like; a tube may be provided to provide a channel for pouring/removing water; UV LEDs for emitting and directing UV light into the water to purify it may be located in a water entry tube, a holding tank, an exit channel, or the like; a power source may include a solar cell, a connection to an external power source (battery, AC), or the like; an internal battery may be used, which could be charged and used later to power the device; a UV sensitive detector or indicator may provide a user with visual confirmation that UV light is or was illuminating and penetrating the water; an output interlock may be provided that would detect when unpurified water (i.e. non-disinfected water) has entered into the holding tank; indicator lights or the like may indicate whether the water in the holding tank had been purified or not; a manual crank or wind-up generator may be included to power up the UV light sources; and the like. In still other embodiments, a mechanical stirring mechanism may be used within the holding tank to circulate the liquid while being exposed to the UV light source.

In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A portable water purification device comprises:
    a portable power supply configured to selectively provide electrical power;
    an ultraviolet light source coupled to the portable power supply, wherein the ultraviolet light source is configured to output ultraviolet light in response to the electrical power;
    a container coupled to the ultraviolet light source, wherein the container is configured to hold water, and wherein the container is configured to reflect ultraviolet light; and
    a pre-filter mechanism coupled to the container, wherein the pre-filter mechanism is configured to filter water before being input into the container.

2. A device of claim 1 further comprising a solar cell coupled to the portable power supply, wherein the solar cell is configured to convert light into electrical energy for storage in the portable power supply.

3. A device of claim 1 further comprising a mechanical crank coupled to the portable power supply, wherein the mechanical crank is configured to convert mechanical energy into electrical energy for storage in the portable power supply.

4. The device of claim 1 wherein a material for the container is selected from a group consisting of: stainless steel, aluminum, glass and silver, glass and aluminum.

5. The device of claim 1 further comprising a power indicator configured to output a visual indication when electrical power is provided to the ultraviolet light source.

6. The device of claim 1 a UV indicator electrically separate from the power indicator configured to detect presence of UV light within the container and output a visual indication when the presence of UV light within the container is detected.

7. The device of claim 6 wherein the UV indicator comprises an LED exposed to the water.

8. The device of claim 1 wherein the ultraviolet light source comprises a UV LED.

9. The device of claim 1 further comprising a timer mechanism coupled to the ultraviolet light source, wherein the timer mechanism is configured to determine when a time the water is exposed to the ultraviolet light exceeds a threshold time.

10. The device of claim 9 further comprising an interlock mechanism coupled to the timer mechanism, wherein the interlock mechanism inhibits water from being removed from the container until the timer mechanism determines that the time exceeds the threshold time.

11. A portable water purification device comprises:
    a housing;
    a battery disposed within the housing, wherein the battery is configured to supply electrical power;
    an ultraviolet light source coupled to the battery and disposed within the housing, wherein the ultraviolet light source is configured to output ultraviolet light in response to the electrical power;
    an initiator circuit coupled to the battery and the ultraviolet light source and disposed within the housing, wherein the initiator circuit is configured to allow electrical power to be provide to the ultraviolet light source in response to an input from a user;
    a container coupled to the ultraviolet light source and disposed within the housing, wherein the container is configured to hold water, and wherein the container is configured to reflect ultraviolet light; a closable, water opening within the housing, wherein the closable, water opening is configured to allow water to be input into the container;
    wherein the initiator circuit comprises a timer mechanism coupled to the ultraviolet light source, wherein the timer mechanism is configured to determine when a time the water in the container is exposed to the ultraviolet light exceeds a threshold time; and
    wherein the closable, water opening is coupled to the timer mechanism, wherein the closable, water opening inhibits the water in the container from being removed from the container until the timer mechanism determines that the time exceeds the threshold time.

12. A device of claim 11 further comprising a solar cell coupled to the battery, wherein the solar cell is configured to convert light into electrical energy for storage in the battery.

13. A device of claim 11 further comprising a mechanical mechanism coupled to the portable power supply, wherein the mechanical mechanism is configured to convert mechanical energy into electrical energy for storage in the battery.

14. The device of claim 11 wherein a material for the container is selected from a group consisting of: stainless steel, aluminum, UV-reflective metal, glass and aluminum, glass and silver.

15. The device of claim 11 further comprising a power indicator coupled to the battery, to the initiator circuit, and disposed within the housing, wherein the power indicator is configured to output a visual indication when electrical power is provided to the ultraviolet light source.

16. The device of claim 11 further comprising a UV indicator coupled to the container and disposed within the housing, wherein the UV indicator is configured to output a visual indication when ultraviolet light is present in the container, and wherein the UV indicator is electrically separate from the power indicator.

17. The device of claim 16 wherein the UV indicator comprises an LED exposed to the water within the container.

18. The device of claim 16 wherein the UV indicator comprises an optical sensor exposed inwards within the container to the water, wherein the optical sensor is configured to optically receive UV light and is configured to generate an electrical signal in response thereto.

19. The device of claim 11 further comprising a pre-filter mechanism coupled between the closable, water opening and the container and disposed within the housing, wherein the pre-filter mechanism is configured to filter water before being water is provided to the container.

20. The device of claim 11 wherein the ultraviolet light source comprises a UV LED.

* * * * *